US010573906B2

(12) United States Patent
Nakata et al.

(10) Patent No.: US 10,573,906 B2
(45) Date of Patent: Feb. 25, 2020

(54) FUEL CELL DEVICE

(71) Applicant: Panasonic Intellectual Property Management Co., Ltd., Osaka (JP)

(72) Inventors: Hideki Nakata, Kyoto (JP); Kunihiro Ukai, Nara (JP); Masakazu Aoki, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 360 days.

(21) Appl. No.: 15/490,824

(22) Filed: Apr. 18, 2017

(65) Prior Publication Data
US 2017/0309931 A1 Oct. 26, 2017

(30) Foreign Application Priority Data

Apr. 26, 2016 (JP) .................. 2016-087930

(51) Int. Cl.
*H01M 8/04014* (2016.01)
*H01M 8/1231* (2016.01)
(Continued)

(52) U.S. Cl.
CPC ........ *H01M 8/04022* (2013.01); *F28D 7/106* (2013.01); *F28D 7/12* (2013.01);
(Continued)

(58) Field of Classification Search
CPC .... F28D 2021/0043; F28D 7/106; F28D 7/12; F28F 1/06; F28F 1/08; H01M 2008/1293; H01M 2300/0074; H01M 8/04014; H01M 8/04022; H01M 8/04067; H01M 8/04074; H01M 8/04089; H01M 8/04201;
(Continued)

(56) References Cited

U.S. PATENT DOCUMENTS

2002/0006535 A1* 1/2002 Woods .................. F23D 11/443
429/411
2010/0227233 A1* 9/2010 Yamamoto ........ H01M 8/04007
429/423

FOREIGN PATENT DOCUMENTS

JP 2012-014921 1/2012
JP 2014-072052 4/2014
WO 2009/051269 A1 4/2009

OTHER PUBLICATIONS

The Extended European Search Report dated Jun. 9, 2017 for the related European Patent Application No. 17167233.0.

* cited by examiner

*Primary Examiner* — Lingwen R Zeng
(74) *Attorney, Agent, or Firm* — McDermott Will & Emery LLP

(57) ABSTRACT

A fuel cell device includes: a reformer that generates a reformed gas; a fuel cell; a combustor that combusts off-gas of the reformed gas and air for power generation, and generates a combustion exhaust gas; a first air heat exchanger that has a combustion exhaust gas path and a first air supply path, and that performs heat exchange between the combustion exhaust gas and the air for power generation; a fuel cell storage which stores the fuel cell; a second air heat exchanger that has a second air supply path that supplies the air for power generation to the fuel cell, and that performs heat exchange between the off-gas of the air for power generation and the air for power generation; and a housing that stores members. The first air supply path and the second air supply path are disposed to cover whole members stored in the housing.

10 Claims, 8 Drawing Sheets

(51) Int. Cl.
*H01M 8/0612* (2016.01)
*H01M 8/124* (2016.01)
*F28F 1/08* (2006.01)
*F28D 7/10* (2006.01)
*H01M 8/2475* (2016.01)
*H01M 8/04089* (2016.01)
*F28F 1/06* (2006.01)
*F28D 7/12* (2006.01)
*H01M 8/04007* (2016.01)
*H01M 8/0662* (2016.01)
*F28D 21/00* (2006.01)
*H01M 8/04082* (2016.01)

(52) U.S. Cl.
CPC .................. *F28F 1/06* (2013.01); *F28F 1/08* (2013.01); *H01M 8/04014* (2013.01); *H01M 8/04074* (2013.01); *H01M 8/04089* (2013.01); *H01M 8/0618* (2013.01); *H01M 8/0631* (2013.01); *H01M 8/0662* (2013.01); *H01M 8/2475* (2013.01); *F28D 2021/0043* (2013.01); *H01M 8/04067* (2013.01); *H01M 8/04201* (2013.01); *H01M 8/1231* (2016.02); *H01M 2008/1293* (2013.01); *H01M 2300/0074* (2013.01)

(58) Field of Classification Search
CPC .............. H01M 8/0618; H01M 8/0631; H01M 8/0662; H01M 8/1231; H01M 8/2475
See application file for complete search history.

FUEL CELL DEVICE

BACKGROUND

1. Technical Field

The present disclosure relates to a fuel cell device that generates power by utilizing a reformed gas produced by reforming a raw material for power generation, and air for power generation.

2. Description of the Related Art

For instance, solid oxide fuel cells are being developed as fuel cells having a high power generation efficiency and capable of utilizing hot exhaust heat. As a configuration that uses hot exhaust heat, some configurations of fuel cell devices which allow heat exchange between discharged combustion gas (exhaust gas) and oxidant gas for power generation have been proposed (see, for example, Japanese Unexamined Patent Application Publication (JP-A) No. 2012-14921 and Japanese Unexamined Patent Application Publication (JP-A) No. 2014-72052).

SUMMARY

One non-limiting and exemplary embodiment provides a fuel cell device that can reduce the amount of heat radiation to the outside and facilitates temperature control of the air for power generation and the component units included in the fuel cell device.

In one general aspect, the techniques disclosed here feature a fuel cell device according to the present disclosure to solve the aforementioned problem, the fuel cell device including: a reformer that reforms a raw material for power generation and generates a reformed gas; a fuel cell that generates electric power utilizing air for power generation and the reformed gas; a combustor that combusts both an off-gas of the reformed gas and an off-gas of the air for power generation discharged from the fuel cell, and generates a combustion exhaust gas which serves as a heat source of the reformer; a first air heat exchanger that has a combustion exhaust gas path through which the combustion exhaust gas flows and a first air supply path through which the air for power generation flows, and that heats the air for power generation by heat exchange between the combustion exhaust gas and the air for power generation; a fuel cell storage which stores the fuel cell, and through which the off-gas of the air for power generation discharged from the fuel cell and heading to the combustor flows; a second air heat exchanger that has a second air supply path which supplies the air for power generation, which has flowed through the first air supply path, to the fuel cell, and that heats the air for power generation by heat exchange between the off-gas of the air for power generation which flows in the fuel cell storage and the air for power generation which flows through the second air supply path; and a housing that stores the reformer, the fuel cell, the combustor, the first air heat exchanger, the fuel cell storage, and the second air heat exchanger. The first air supply path and the second air supply path are disposed to cover whole members stored in the housing.

A fuel cell device according to the present disclosure is configured as described above, and achieves the effect that the amount of heat radiation to the outside can be reduced and temperature control of the air for power generation and the component units included in the fuel cell device is facilitated.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8A illustrates a geometry of the boundary wall having no projection-and-depression portion, FIG. 8B illustrates a geometry of the boundary wall in which a projection-and-depression portion is formed in a region corresponding to an outer circumference of each of an evaporator and a reformer, FIG. 8C illustrates a geometry of the boundary wall in which a projection-and-depression portion is formed only in a region corresponding to the outer circumference of the evaporator, and FIG. 8D illustrates a geometry of the boundary wall in which a projection-and-depression portion is formed only in a region corresponding to the outer circumference of the reformer.

Figure 1:
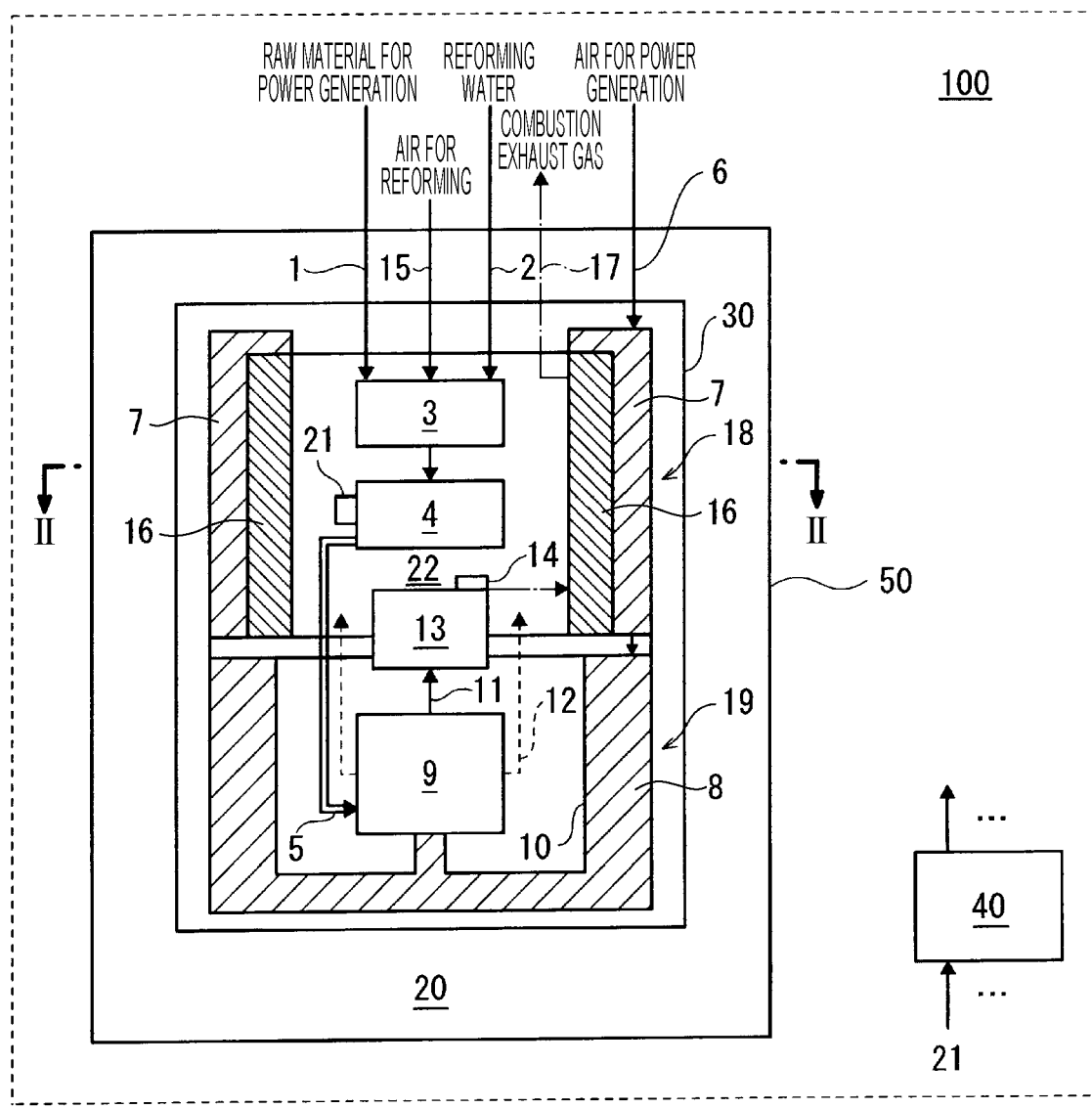
FIG. 1 is a schematic diagram illustrating an example of the main configuration of a fuel cell system according to an embodiment.

DETAILED DESCRIPTION (Underlying Knowledge Forming Basis of the Present Disclosure)

The inventors have intensively studied the fuel cell devices described in "2. Description of the Related Art", and have found out the following problems.

First, the fuel cell device disclosed in JP-A No. 2012-14921 has a configuration in which a heat exchanger that heats an oxidant gas (air for power generation) using the heat of a combustion exhaust gas is provided along the upper face and the short-side lateral face on the right side of a fuel cell. Specifically, a fuel cell set (cell stack) is disposed at a lower portion of a closed space formed in a housing, a combustion chamber is disposed above the cell stack, and a reformer is disposed above the combustion chamber. Then a heat exchanger is provided on the upper face and the short-side lateral face in the housing provided with the cell stack, the combustion chamber, and the reformer.

Also, the fuel cell device disclosed in JP-A No. 2014-72052 discloses a configuration in which a fuel gas supply flow path, an exhaust gas discharge flow path, and an oxidant gas supply flow path are disposed so as to surround the periphery of a cell stack inside a fuel cell storage container (housing). In the fuel cell device disclosed in JP-A No. 2014-72052, a fuel gas supply flow path is provided so as to receive heat from the cell stack and a combustor, and an exhaust gas discharge flow path and an oxidant gas supply flow path are provided so as to allow heat exchange between a combustion exhaust gas and an oxidant gas.

In other words, in the fuel cell device disclosed in JP-A Nos. 2012-14921 and 2014-72052, the component units included in the fuel cell device, such as the cell stack, the combustion chamber, and the reformer are disposed in the same storage space, and a heat exchange unit which serves between the combustion exhaust gas and the air for power generation is provided in the periphery of those component units. The inventors have found out that in such a configuration in which the fuel cell devices are disposed in the same storage space and heat exchange is performed between the combustion exhaust gas and the air for power generation in the periphery of the component units, the amount of heat held by the combustion exhaust gas may not be appropriately distributed to the component units such as the reformer and the cell stack, and for instance, the temperature of the reformer or the cell stack may increase too much or decrease depending on operating conditions. Particularly, in a fuel cell device including a solid oxide fuel cell as a power generator, when the temperature of the air for power generation or the raw material for power generation as well as the amount of supply of these are changed due to a change in the load at the time of power generation, the heat balance in the fuel cell device is significantly changed. In this case, it difficult for the fuel cell devices disclosed in JP-A Nos. 2012-14921 and 2014-72052 to heat the component units at an appropriate temperature.

Also, in the fuel cell device disclosed in JP-A Nos. 2012-14921 and 2014-72052, a heat exchange unit which serves between the combustion exhaust gas and the air for power generation is provided in the periphery of the cell stack. Particularly, in the fuel cell device disclosed in JP-A No. 2014-72052, air for power generation at a low temperature with low heat transfer by conduction flows through the outermost periphery around the cell stack, and thus it is probably possible to reduce heat radiation to the outside from the periphery of the cell stack. However, in the fuel cell devices disclosed in JP-A Nos. 2012-14921 and 2014-72052, the bottom of the cell stack, which is a high temperature area, is not covered with the air for power generation. Thus, the inventors have found that heat radiation to the outside from the bottom of the cell stack at a high temperature is increased, and as a result, the efficiency of power generation is decreased.

As a result of intensive discussion on the problems, the inventors have obtained the following idea. That is, the inside of the housing to store the component units included in the fuel cell device is separated into two space areas according their function, and a heat exchanger, which exchanges heat with the air for power generation, is provided for each space area. The inventors have found that with this configuration, for each space area, medium which exchanges heat with the air for power generation can be isolated, and temperature control of the air for power generation and the component units is facilitated. Furthermore, the inventors have found that with a configuration that covers the outer periphery of each component unit of the fuel cell device by a flow path through which the air for power generation flows, the amount of heat radiation to the outside can be reduced, and thus the present disclosure has been achieved. The present disclosure provides the following aspects.

A fuel cell device according to a first aspect of the present disclosure includes: a reformer that reforms a raw material for power generation and generates a reformed gas; a fuel cell that generates electric power utilizing air for power generation and the reformed gas; a combustor that combusts both an off-gas of the reformed gas and an off-gas of the air for power generation discharged from the fuel cell, and generates a combustion exhaust gas which serves as a heat source of the reformer; a first air heat exchanger that has a combustion exhaust gas path through which the combustion exhaust gas flows and a first air supply path through which the air for power generation flows, and that heats the air for power generation by heat exchange between the combustion exhaust gas and the air for power generation; a fuel cell storage which stores the fuel cell, and through which the off-gas of the air for power generation discharged from the fuel cell and heading to the combustor flows; a second air heat exchanger that has a second air supply path which supplies the air for power generation, which has flowed through the first air supply path, to the fuel cell, and that heats the air for power generation by heat exchange between the off-gas of the air for power generation which flows in the fuel cell storage and the air for power generation which flows through the second air supply path; and a housing that stores the reformer, the fuel cell, the combustor, the first air heat exchanger, the fuel cell storage, and the second air heat exchanger. The first air supply path and the second air supply path are disposed to cover whole members stored in the housing.

With the above-described configuration, the amount of heat radiation to the outside from the inside of the housing can be significantly reduced by covering the whole members stored in the housing by the first air supply path and the second air supply path. For this reason, for instance, when the outer periphery of the housing of the fuel cell device is covered by a heat insulator, the layer thickness of the heat insulator can be thinned, and thus miniaturization and low cost of the fuel cell device can be achieved.

Also, the space area in the housing is separated into a fuel cell storage portion that stores the fuel cell and the other area, and the former area is provided with the second air heat exchanger, and the latter area is provided with the first air heat exchanger. Therefore, for each space area, medium which exchanges heat with the air for power generation can be isolated, and the temperature of the air for power generation supplied to the fuel cell is adjustable with high accuracy so as to be closer to the temperature of the fuel cell.

Also, heat is exchanged between the combustion exhaust gas which flows through the combustion exhaust gas path and the air for power generation which flows through the first air supply path. In addition, the combustion exhaust gas is also a heat source of the reformer. Specifically, the heat held by the combustion exhaust gas can be utilized only for heating the combustion exhaust gas which flows through the combustion exhaust gas path, and heating the reformer. Therefore, temperature control of the component units (reformer) included in the fuel cell device can be easily performed to maintain an appropriate temperature range.

Consequently, the fuel cell device according to the first aspect provides the effects that the amount of heat radiation to the outside can be reduced and temperature control of the air for power generation and the component units included in the fuel cell device is facilitated.

A second aspect of the present disclosure provides the fuel cell device according to the above-described first aspect and may adopt a configuration in which the reformer generates the reformed gas from the raw material for power generation by steam reforming, an evaporator that supplies vapor to the reformer is provided in the housing, the vapor being obtained by evaporating reforming water utilized in the steam reforming, and the combustion exhaust gas serves as a heat source of the reformer and the evaporator.

With the above-described configuration, the fuel cell device includes the evaporator, and the reformer can reform the raw material for power generation by the steam reforming, and thus reformed gas can be efficiently generated.

Also, heat is exchanged between the combustion exhaust gas which flows through the combustion exhaust gas path and the air for power generation which flows through the first air supply path. The combustion exhaust gas is also a heat source of the reformer and the evaporator. Specifically, the heat held by the combustion exhaust gas can be utilized only for heating the air for power generation which flows through the first air supply path, and for heating the reformer and the evaporator. Therefore, temperature control of the reformer and the evaporator as the component units included in the fuel cell device can be easily performed to maintain an appropriate temperature range.

A third aspect of the present disclosure provides the fuel cell device according to the above-described second aspect and may adopt a configuration in which the combustion exhaust gas path is disposed to surround a lateral side of each of the reformer and the evaporator, the first air supply path is disposed to surround an outer periphery of the combustion exhaust gas path, and the second air supply path is disposed along an outer periphery of the fuel cell storage.

With the above-described configuration, the combustion exhaust gas path is disposed to surround the lateral sides of each of the reformer and the evaporator, and thus the reformer and the evaporator can be heated efficiently and uniformly by the heat held by the combustion exhaust gas which flows through the combustion exhaust gas path. In addition, since the first air supply path is disposed to surround the outer periphery of the combustion exhaust gas path, and thus heat can be efficiently exchanged between the combustion exhaust gas and the air for power generation. In addition, since the second air supply path is disposed along the outer periphery of the fuel cell storage, heat can be efficiently exchanged between the off-gas of the air for power generation and the air for power generation in the fuel cell storage.

A fourth aspect of the present disclosure provides the fuel cell device according to the above-described third aspect and may adopt a configuration in which the reformer and the evaporator are disposed in a combustion space provided over the combustor, and the fuel cell is disposed in the fuel cell storage provided under the combustor.

With the above-described configuration, the component members (the reformer, the evaporator) to be heated by the combustion heat generated by the combustor and the heat held by the combustion exhaust gas are disposed in the combustion space, which is separated from a space in which the other members (fuel cell) are disposed. Therefore, temperature management of the component units can be performed with high accuracy.

A fifth aspect of the present disclosure provides the fuel cell device according to the above-described third or fourth aspect and may adopt a configuration in which the first air heat exchanger includes a tube-shaped inner peripheral wall that surrounds a lateral side of each of the reformer and the evaporator, a tube-shaped boundary wall that is disposed outwardly of the inner peripheral wall to surround the inner peripheral wall, and that serves as a boundary between the combustion exhaust gas path and the first air supply path, and a tube-shaped outer peripheral wall that is disposed outwardly of the boundary wall to surround the boundary wall, and the combustion exhaust gas path is formed in a space between the inner peripheral wall and the boundary wall, and the first air supply path is formed in a space between the boundary wall and the outer peripheral wall.

With the above-described configuration, the first air heat exchanger can be constituted by the tube-shaped inner peripheral wall, the boundary wall, and the outer peripheral wall, and thus the surface area of the housing can be decreased, miniaturization of the fuel cell device can be achieved, and heat radiation to the outside of the housing can be reduced. Also, a tube-shaped member is easily produced, and thus the first air heat exchanger can be easily manufactured.

A sixth aspect of the present disclosure provides the fuel cell device according to the above-described fifth aspect and may adopt a configuration in which in the first air heat exchanger, a projection-and-depression portion is formed in at least part of the boundary wall.

With the above-described configuration, the projection-and-depression portion is formed in at least part of the boundary wall, and thus the area of heat exchange between the first air supply path and the combustion exhaust gas path can be increased in the first air heat exchanger. In addition, a turbulent flow can be generated in each of the air for power generation and the combustion exhaust gas, and thus the coefficient of heat transfer can be increased.

Therefore, in a portion where a projection-and-depression portion is formed, the amount of heat exchange between the combustion exhaust gas and the air for power generation can be increased. Conversely, when a portion where a projection-and-depression portion is formed in the boundary wall corresponds to the position of the outer periphery of the reformer or the evaporator, the amount of heat given to the reformer or the evaporator from the combustion exhaust gas is reduced. Therefore, the amount of heat given to each the reformer, the evaporator, and the air for power generation from the combustion exhaust gas can be adjusted by the position where the projection-and-depression portion is formed.

In addition, the heat held by the combustion exhaust gas can be efficiently distributed to each of the air for power generation, the reformer, and the evaporator in consideration of the position of formation of a projection-and-depression portion, and the heat held by the combustion exhaust gas can be effectively utilized. Therefore, the amount of heat held by the combustion exhaust gas when discharged to the outside from the housing can be significantly reduced, and thus improvement of the power generation efficiency in the fuel cell device can be achieved.

A seventh aspect of the present disclosure provides the fuel cell device according to the above-described sixth aspect and may adopt a configuration in which in the projection-and-depression portion, a projection portion projecting in a radial direction of the boundary wall is spirally arranged in an outer periphery of the tube-shaped boundary wall.

With the above-described configuration, the projection portion in the projection-and-depression portion is spirally arranged in the outer periphery of the boundary wall, and thus the area of heat exchange between the first air supply path and the combustion exhaust gas path can be increased. Also, when the flow path width of each of the combustion exhaust gas path and the first air supply path is narrowed by the projection-and-depression portion so as to increase a pressure loss, the heat exchange performance of the first air heat exchanger can be further improved.

An eighth aspect of the present disclosure provides the fuel cell device according to the above-described sixth aspect and may adopt a configuration in which in the projection-and-depression portion, plural projection portions projecting in a radial direction of the boundary wall, formed over an entire periphery in a circumferential direction of the tube-shaped boundary wall are arranged at predetermined intervals.

With the above-described configuration, in the projection-and-depression portion, plural projection portions formed over the entire circumference in a circumferential direction of the boundary wall are arranged at predetermined intervals. Therefore, the projection-and-depression portion is easily produced and the first air heat exchanger can be manufactured at low cost.

A ninth aspect of the present disclosure provides the fuel cell device according to any one of the above-described first to eighth aspects and may adopt a configuration in which the reformer is located under the evaporator in a combustion space of the combustor, the combustion exhaust gas path is provided between the evaporator and the first air supply path as well as between the reformer and the first air supply path, and the reformer is heated by combustion heat of the combustor, the reformer and the evaporator are heated in this order by heat held by the combustion exhaust gas generated by the combustor, and the air for power generation is heated in the first air heat exchanger.

With the above-described configuration, the air for power generation is heated by the heat held by the combustion exhaust gas, and the reformer and the evaporator can be heated in this order to maintain at appropriate temperature ranges. Thus, overheating and insufficient temperature increase can be protected, and improvement of power generation efficiency, maintaining of reforming performance, and maintaining of evaporating performance can be achieved.

More specifically, in order to maintain the reforming performance, it is necessary to maintain reforming catalyst to be filled in the reformer in an appropriate temperature range. It is also necessary to avoid overheating of the evaporator. Specifically, when the evaporator is overheated, phenomenon such as bumping occurs, and a pressure fluctuation occurs in the fuel cell device. A problem then arises in that pulsation of the air for power generation or the combustion exhaust gas occurs due to the pressure fluctuation, and the amount of power generation of the fuel cell device fluctuates.

However, the fuel cell device according to the ninth aspect of the present disclosure allows each of the reformer and the evaporator to maintain an appropriate temperature range by the heat held by the combustion exhaust gas. Consequently, the reformer is stabilized and the raw material for power generation can be reformed, and bumping in the evaporator is protected and fluctuation of the amount of power generation due to the bumping is reduced, and thus stable power generation can be achieved.

Hereinafter, an embodiment of the present disclosure will be described with reference to the drawings. It is to be noted that hereinafter the same or corresponding constituent members through all the figures are labeled with the same reference symbol, and a description thereof is omitted.

Embodiment

Figure 2:
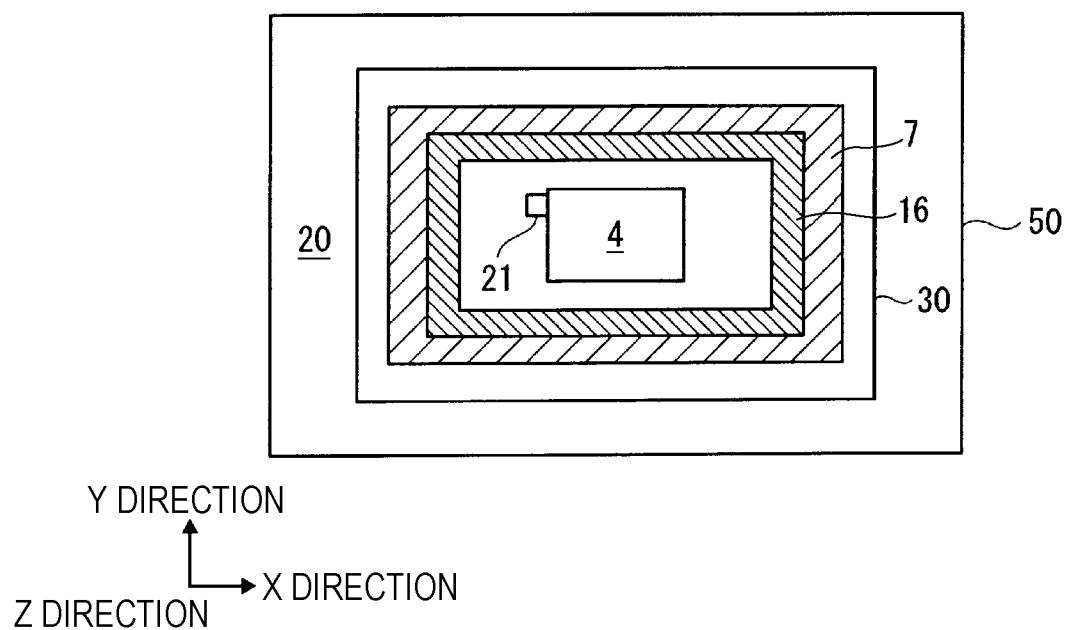
FIG. 2 is a sectional view of the fuel cell device illustrated in FIG. 1 taken along line II-II.

A fuel cell system 100 according to an embodiment will be described with reference to FIG. 1 and FIG. 2. FIG. 1 is a schematic diagram illustrating an example of the main configuration of the fuel cell system 100 according to the embodiment. FIG. 1 schematically illustrates the configuration, as seen from a lateral side, of a fuel cell device 50 included in the fuel cell system 100 according to the embodiment. FIG. 2 is a sectional view of the fuel cell device 50 illustrated in FIG. 1 taken along line II-II.

(Configuration of Fuel Cell System)

As illustrated in FIG. 1, the fuel cell system 100 includes the fuel cell device 50 and a controller 40. Although not particularly illustrated in FIG. 1, the fuel cell system 100 may further include a supply pump for supplying air for power generation, a raw material for power generation, reforming water, air for reforming to the fuel cell device 50. It is to be noted that in this embodiment, the fuel cell device 50 which uses a solid oxide fuel cell in a power generator is illustrated and described.

The fuel cell device 50 includes a material supply path 1, a reforming water supply path 2, an evaporator 3, a reformer 4, a reformed gas path 5, an air supply path 6 for power generation, a first air supply path 7, a second air supply path 8, a fuel cell 9, a fuel cell storage 10, a reformed gas off-gas path 11, an air off-gas path 12 for power generation, a combustor 13, an ignitor 14, an air supply path 15 for reforming, a combustion exhaust gas path 16, a combustion exhaust gas discharge path 17, a first air heat exchanger 18, a second air heat exchanger 19, a heat insulator 20, a temperature sensor 21 and a housing 30.

In the fuel cell device 50, a raw material for power generation supplied from the outside of the housing 30 is reformed by the reformer 4, and the fuel cell 9 utilizes the reformed gas and air for power generation supplied from the outside to generate electric power by an electrochemical reaction between hydrogen and oxygen.

It is to be noted that in the present description, the gas supplied from the outside through the material supply path 1 is referred to as a raw material for power generation, and a gas, which is generated by reforming the raw material for power generation via a reforming reaction in the reformer 4, is referred to as a reformed gas. As the raw material for power generation, a gas consisting primarily of hydrocarbon, such as a city gas or a propane gas may be illustrated, for instance.

In the fuel cell system 100, the raw material for power generation, reforming water, and the air for power generation are supplied to the fuel cell device 50 at an appropriate timing through the material supply path 1, the reforming water supply path 2, and the air supply path 6 for power generation, respectively. Each of the raw material for power generation, the reforming water, and the air for power generation may be pressurized and supplied by a supply pump (not illustrated), for instance. Although described later in detail, when the fuel cell system 100 is started, the raw material for power generation can be reformed also by a partial oxidation process in the reformer 4. Thus, when the fuel cell system 100 is started, air for reforming is supplied to the reformer 4 through the air supply path 15 for reforming.

Although not particularly illustrated in FIG. 1 and FIG. 2, the material supply path 1 may be provided with a desulfurizer (not illustrated) for removing a sulfur component contained in the raw material for power generation. As an example of a desulfurizer, a sulfur component contained in the raw material for power generation is removed by a hydrodesulfurization process. A desulfurizing agent to be filled in the desulfurizer includes, for instance, a desulfurizing agent containing copper and zinc. It is to be noted that the desulfurizing agent is not limited to the aforementioned desulfurizing agent as long as hydrodesulfurization can be performed, and the desulfurizing agent may be a combination of Ni—Mo based catalyst or Co—Mo based catalyst and zinc oxide. In the case where a desulfurizing agent is created by combining Ni—Mo based or Co—Mo based catalyst and zinc oxide, the organic sulfur in the fuel gas is hydrocracked by the desulfurizer in a temperature range of 350 to 400° C. The desulfurizer then removes generated $H_2S$ by adsorbing $H_2S$ by ZnO in a temperature range of 350 to 400° C.

For instance, when the fuel gas is a city gas, as an odorant, dimethyl sulfide ($C_2H_6S$, hereinafter, referred to as DMS) which is a sulfur compound is contained in the city gas. The DMS is removed by a desulfurizer in the form of ZnS or physical adsorption in the following reaction formula (Expression (1), (2)).

$$C_2H_6S + 2H_2 \rightarrow 2CH_4 + H_2S \qquad (1)$$

$$H_2S + ZnO \rightarrow H_2O + ZnS \qquad (2)$$

It is to be noted that the odorant is not limited to the DMS described above, and may be other sulfur compounds such as TBM ($C_4H_{10}S$) or THT ($C_4H_8S$).

In the case where the desulfurizing agent to be filled contains copper and zinc, the desulfurizer performs desulfurization in a temperature range of 10 to 400° C., preferably 150 to 300° C. The Co—Zn based desulfurizing agent also has physical adsorption capability in addition to hydrodesulfurization capability, and can perform mainly physical adsorption at a low temperature and mainly chemical adsorption ($H_2S+ZnO \rightarrow H_2O+ZnS$) at a high temperature. In this case, the sulfur content contained in the fuel gas after the desulfurization is 1 vol parts per billion (ppb) or less, normally 0.1 vol ppb or less.

When Ni—Mo based or Co—Mo based catalyst or a desulfurizing agent containing either one of Co and Zn is filled in the desulfurizer, the amount of sulfur component to be removed per unit volume is increased. Therefore, when the above-described desulfurizing agent is used, it is possible to reduce the amount of the desulfurizing agent needed to remove sulfur to a desired sulfur concentration. The raw material for power generation desulfurized by a desulfurizer in this manner may be supplied to the reformer 4 along with water for reforming, vaporized by the evaporator 3.

The evaporator 3 is connected to the material supply path 1 and the reforming water supply path 2, and reforming water supplied from the outside is heated and vaporized by the heat held by the combustion exhaust gas. The evaporator 3 then supplies vapor obtained by vaporizing the reforming water to the reformer 4 along with the raw material for power generation supplied from the outside.

When the raw material for power generation and vapor are supplied from the evaporator 3, the reformer 4 reforms the raw material for power generation by steam reforming, and generates a reformed gas which is a hydrogen containing gas. The reformed gas generated by the reformer 4 is supplied to the fuel cell 9 from the reformer 4 through the reformed gas path 5. It is to be noted that as a reforming catalyst to be filled in the reformer 4, Ni impregnated and supported on the spherical surface of $Al_2O_3$ (alumina), or ruthenium applied to the spherical surface of $Al_2O_3$ may be used as needed.

Although the reformer 4 reforms the material gas by steam reforming and generates a reformed gas, the raw material for power generation may be reformed not only by the steam reforming but also by the partial oxidation process. That is, when the fuel cell system 100 is started, heat energy needed for performing steam reforming, which is an endothermic reaction, is insufficient in the reformer 4. Thus, when the fuel cell system 100 is started, supply of the reforming water to the evaporator 3 is stopped, and air for reforming is supplied to the reformer 4 through the air supply path 15 for reforming. The reformer 4 reforms the raw material for power generation by the partial oxidation process represented by the following Expressions (3), and generates hydrogen gas and carbon monoxide.

$$C_nH_m + (n/2)O_2 \rightarrow n \cdot CO + (m/2)H_2 \text{ ($n$ and $m$ are any natural numbers)} \qquad (3)$$

These hydrogen gas and carbon monoxide (hydrogen containing gas) are supplied to the fuel cell 9 through the reformed gas path 5. The fuel cell 9 performs a power generation reaction utilizing hydrogen containing gas supplied from the reformer 4, and the air for power generation supplied through the second air supply path 8.

Also, as the operation of the fuel cell device 50 proceeds in the fuel cell system 100, the temperature of the reformer 4 increases. In other words, the partial oxidation process represented by Expression (3) is an exothermic reaction. Furthermore, the temperature of the reformer 4 is increased by the radiant heat caused by combustion of the combustor 13, or the heat held by the combustion exhaust gas generated at the time of the combustion. When the temperature of the reformer 4 exceeds, for instance, 400° C., the steam reforming reaction represented by the following Expressions (4) can be carried out concurrently.

$$C_nH_m + n \cdot H_2O \rightarrow n \cdot CO + (m/2+n)H_2 \text{ ($n$ and $m$ are any natural numbers)} \qquad (4)$$

When the steam reforming reaction represented by Expression (4) is compared with the partial oxidation process represented by Expression (3), the amount of hydrogen generated from the same amount of hydrocarbon ($C_nH_m$) is increased. As a result, the amount of hydrogen available for the power generation reaction in the fuel cell 9 increases. In other words, the reformed gas can be efficiently generated by reforming the raw material for power generation via the steam reforming reaction.

When the temperature of the reformer 4 exceeds, for instance, 600° C., as the operation of the fuel cell system 100 proceeds, heat energy necessary for the steam reforming reaction of Expression (4) can be supplied only by the heat held by the combustion exhaust gas, the combustion heat of the combustor 13, and the radiant heat caused by the combustion. Thus, the controller 40, when determining that the temperature of the reformer 4 exceeds, for instance, 600° C. based on a result of detection by the temperature sensor 21, stops the supply of air for reforming, and switches to the operation using only the steam reforming reaction.

The air supply path 6 for power generation is a path for supplying the air for power generation (oxidant gas) used for power generation by the fuel cell 9, and is connected to the first air supply path 7 to communicate therewith. Also, the first air supply path 7 is a path through which air for power generation flows, the air for power generation being supplied from the outside through the air supply path 6 for power generation. The first air supply path 7 is connected to the second air supply path 8 so as to communicate therewith, at an end on a side opposite to the side connected to the air supply path 6 for power generation.

The second air supply path 8 is a path through which the air for power generation which has flowed through the first air supply path 7 flows, and is connected to the fuel cell 9 so as to communicate therewith. Therefore, the air for power generation, which flows through the air supply path 6 for power generation, is supplied to the fuel cell 9 through the first air supply path 7 and the second air supply path 8.

As illustrated in FIG. 2, the first air supply path 7 is disposed along the outside of the combustion exhaust gas path 16 disposed in a rectangular shape so as to surround the outer periphery of the lateral sides of the rectangular parallelepiped-shaped reformer 4. The first air supply path 7 and the combustion exhaust gas path 16 constitute the first air heat exchanger 18. The first air heat exchanger 18 exchanges heat between the air for power generation which flows through the first air supply path 7, and the combustion exhaust gas which flows through the combustion exhaust gas path 16, and heats the air for power generation. In FIG. 1, the combustion exhaust gas flows upward from below, and the air for power generation flows downward from the above, and both flows are opposite flows. For this reason, both can efficiently exchange heat. Due to the heat exchange, as the combustion exhaust gas moves upward, the amount of heat held thereby decreases, and the temperature is reduced. On the other hand, as the air for power generation moves downward from the above, the temperature is increased because the air for power generation exchanges heat with the combustion exhaust gas having a higher temperature.

On the other hand, as illustrated in FIG. 1, the second air supply path 8 is disposed along the outer periphery (the lateral faces and the bottom face in the example of FIG. 1) of the rectangular parallelepiped-shaped fuel cell storage 10, and the air for power generation, which has flowed through the first air supply path 7, is supplied to the fuel cell 9. The second air heat exchanger 19 has the second air supply path 8, and exchanges heat between the air off-gas for power generation in the fuel cell storage 10, and the air for power generation which flows through the second air supply path 8, and heats the air for power generation. For instance, the air for power generation, which has flowed through the first air heat exchanger 18 and the second air heat exchanger 19, is heated up to 400 to 800° C. The heated air for power generation is then supplied to the fuel cell 9. In this manner, the air for power generation to be supplied to the fuel cell 9 can be heated to nearly the temperature of the fuel cell 9, and supplied to the fuel cell 9.

The fuel cell 9 utilizes supplied reformed gas and air for power generation to generate electric power by an electrochemical reaction between hydrogen and oxygen. Specifically, the fuel cell 9 has a fuel electrode to which a reformed gas is supplied and an air electrode to which air for power generation is supplied, and is formed as a cell stack in which plural unit cells, which generate power between the fuel electrode and the air electrode, are connected in series. It is to be noted that the fuel cell 9 may adopts a configuration in which cell stacks connected in series may be connected in parallel. As the unit cell, it is possible to use an unit cell consisting of, for instance, zirconia (YSZ) made by doping yttria, zirconia (YSZ) made by doping ytterbium or scandium, or lanthanum gallate-based solid electrolyte. For instance, when the unit cell is YSZ, a power generation reaction is performed in a temperature range approximately 600 to 900° C. depending on the cell thickness.

The reformed gas (off-gas of reformed gas) containing hydrogen unused for power generation, discharged from the fuel cell 9, is supplied to the combustor 13 through the reformed gas off-gas path 11. The air for power generation (off-gas of air for power generation) containing oxygen unused for power generation is discharged from the fuel cell 9 into the fuel cell storage 10, and supplied to the combustor 13 through the fuel cell storage 10.

The combustor 13 burns the off-gas of reformed gas, and the off-gas of air for power generation, and heats the reformer 4 provided in a combustion space 22 of the combustor 13 by the combustion heat. Also, the combustor 13 generates a combustion exhaust gas which serves as the heat source of the evaporator 3 and the reformer 4 by burning the off-gas of reformed gas and the off-gas of air for power generation. The combustion exhaust gas flows through the combustion exhaust gas path 16 which is disposed so as to surround the lateral sides of each of the evaporator 3 and the reformer 4.

The combustion exhaust gas, when flowing through the combustion exhaust gas path 16, exchanges heat with the air for power generation which flows through the first air supply path 7 provided to be in contact with the outer circumference of the combustion exhaust gas path 16, and is discharged from the upper face of the housing 30 to the outside via the combustion exhaust gas discharge path 17. The combustion exhaust gas also heats the reformer 4 and the evaporator 3 which are disposed on the radially inner side of the combustion exhaust gas path 16. Specifically, the reformer 4 which needs to be heated by high-temperature heat is heated by the combustion heat of the combustor 13, the radiant heat of the combustion heat, and the heat held by the combustion exhaust gas. On the other hand, the evaporator 3, which less needs to be heated by high-temperature heat than the reformer 4, can be heated by the combustion exhaust gas, for which part of the held heat has been drawn by heat exchange with the air for power generation. Thus, each of the reformer 4 and the evaporator 3 can be heated to an appropriate temperature by adjusting the amount of heat exchange between the combustion exhaust gas and the air for power generation.

Like this, in the fuel cell device 50 according to this embodiment, when power is generated by the fuel cell 9, the combustor 13 burns the off-gas of reformed gas and the off-gas of air for power generation, generates the hot combustion exhaust gas, and achieves highly efficient power generation operation by effectively utilizing the heat energy.

Also, the fuel cell device 50 according to this embodiment adopts a configuration in which the temperature sensor 21 is provided in the reformer 4 to allow the temperature of the reformer 4 to be monitored. However, the location in which the temperature sensor 21 is provided is not limited to the reformer 4. For instance, the temperature sensor 21 may be provided in the vicinity of the combustor 13 or in the stack of the fuel cell 9. When the temperature sensor 21 is provided in the reformer 4, it is possible to determine whether or not the temperature of the reformer 4 has been increased to an active temperature of the reforming catalyst filled in the reformer 4. Also, when the temperature sensor 21 is provided in the vicinity of the combustor 13, a combustion state in the combustor 13 can be recognized. Also, when the temperature sensor 21 is provided in the stack of the fuel cell 9, it is possible to recognize whether or not power is generated in the fuel cell 9 in a normal state. It is to be noted that the number of temperature sensors 21 provided in the fuel cell device 50 is not limited to one, and may be any number.

In the fuel cell system 100 according to this embodiment, a result of the detection by the temperature sensor 21 is sent to the controller 40. The controller 40 performs control to adjust the amount of supply of the air for power generation and the raw material for power generation, and the amount of power generation in the fuel cell 9 based on the received result of detection by the temperature sensor 21 so that the evaporator 3, the reformer 4, the fuel cell 9 maintain a predetermined temperature range, and the combustion temperature of the combustor 13 is further in a predetermined temperature range. It is to be noted that adjustment of the amount of supply of the air for power generation and the raw material for power generation can be achieved by controlling the opening and closing of a flow regulating valve (not illustrated) provided in each of the material supply path 1 and the air supply path 6 for power generation. The controller 40 includes, for instance, an arithmetic processor which can be illustrated by an MPU, a CPU, and a storage which can be illustrated by a memory, then CPU or the like reads a program stored in the memory, and executes the program, thereby making it possible to perform various types of control.

In the fuel cell device 50, the heat insulator 20 is provided outwardly of the housing 30 so as to cover the housing 30, and heat radiation from the inside of the housing 30 of the fuel cell device 50 to the outside is blocked as much as possible.

(Arrangement Relationship Between Component Units)

Next, the arrangement relationship between the component units included in the fuel cell device 50 will be described.

As illustrated in FIG. 1, in the housing 30 of the fuel cell device 50, the reformer 4 is disposed in the combustion space 22 of the combustor 13, and the evaporator 3 is disposed above the reformer 4. On the other hand, the fuel cell storage 10 is disposed below the combustor 13, and the fuel cell 9 is provided in the fuel cell storage 10. In other words, the space in which the evaporator 3 and the reformer 4 are provided, and the space in which the fuel cell 9 is provided are separated with the boundary of the combustor 13.

In addition, the periphery of the reformed gas path 5, the combustion exhaust gas path 16, the evaporator 3, the reformer 4, the combustor 13, and the fuel cell storage 10 is overall covered by the first air supply path 7 included in the first air heat exchanger 18 and the second air supply path 8 included in the second air heat exchanger 19. In short, the first air supply path 7 and the second air supply path 8 are disposed so as to cover the entire members stored in the housing 30.

It is to be noted that the upper face of the housing 30 of the fuel cell device 50 is configured to allow connection to the material supply path 1, the reforming water supply path 2, the air supply path 15 for reforming, and the combustion exhaust gas discharge path 17. In this configuration, a portion may be present where the first air supply path 7 and the second air supply path 8 cannot be physically disposed. However, even in the case of such a configuration, an air layer is formed in a hollow portion at an upper portion of the housing 30, and thus it can be stated that the entire members stored in the housing 30 are completely covered by the air for power generation supplied to the fuel cell 9 and the air layer.

(Temperature Control in Fuel Cell System)

Next, the temperature control of each component unit in the fuel cell device 50 will be described. In the fuel cell device 50, the evaporator 3 and the reformer 4 are installed in the vicinity of the first air heat exchanger 18, and thus can be heated up to a temperature appropriate to the function of each of the evaporator 3 and the reformer 4 by utilizing the heat held by the high-temperature combustion exhaust gas. In addition, the air for power generation passes through the first air heat exchanger 18 and the second air heat exchanger 19, exchanges heat with the combustion exhaust gas, and the air for power generation is thereby heated to an appropriate temperature. Here, the flow of the combustion exhaust gas generated in the combustor 13 will be first described.

The flow rate and the temperature of the combustion exhaust gas generated in the combustor 13 can be controlled by adjusting a fuel use rate (a proportion of the reformed gas consumed as a fuel by the fuel cell 9 via a power generation reaction) of the fuel cell 9. In this embodiment, the fuel use rate is set so that the temperature range at the time of combustion of the combustor 13 is approximately 600 to 900° C., for instance.

The combustion exhaust gas generated in the combustor 13 having thus set temperature range heats the reformer 4 and the evaporator 3, and thus part of the heat held by the combustion exhaust gas is consumed. Also, the heat held by the combustion exhaust gas is further partially drawn by the heat exchange with the air for power generation in the first air heat exchanger 18, and is reduce to an appropriate temperature in order to be discharged to the outside through the combustion exhaust gas discharge path 17. For instance, the temperature of the combustion exhaust gas when generated in the combustor 13 is approximately 600 to 900° C. which is a high temperature. However, the combustion exhaust gas heats the reformer 4 and the evaporator 3, and further the temperature of the combustion exhaust gas is sufficiently reduced by the heat exchange with the air for power generation in the first air heat exchanger 18 until the combustion exhaust gas is discharged to the outside.

For instance, when power generation of 1 kW is performed in the fuel cell 9, air for power generation at 50 L/min or higher is supplied to the fuel cell 9. Thus, the air for power generation at 50 L/min or higher needs to be heated to approximately 400 to 800° C. starting from the ambient temperature. Thus, a large amount of heat is needed for the heat exchange between the combustion exhaust gas and the air for power generation in the first air heat exchanger 18, and thus the temperature of the combustion exhaust gas is sufficiently reduced.

Thus, in the fuel cell system 100 according to this embodiment, the temperature of the combustion exhaust gas discharged to the outside from the fuel cell device 50 is controlled at a desired value in consideration of the flow rate and the temperature of the combustion exhaust gas generated in the combustor 13, the amount of heat absorbed by the reformer 4 and the evaporator 3, and the amount of heat absorbed by the first air heat exchanger 18. It is to be noted that after the combustion exhaust gas is discharged from the fuel cell device 50, the combustion exhaust gas may generate hot water by heat exchange with water, for instance. Like this, the heat held by the combustion exhaust gas discharged is utilized to generate hot water, and the hot water is stored in a hot water reservoir tank, thereby making it possible to effectively use the exhaust heat of the fuel cell device 50. When hot water is generated by heat exchange between the combustion exhaust gas and water, the temperature of the combustion exhaust gas discharged from the fuel cell device 50 is set to range of approximately 150 to 200° C.

As described above, in the fuel cell system 100 according to this embodiment, the heat held by the combustion exhaust gas in the fuel cell device 50 is effectively utilized for heating of the reformer 4 and the evaporator 3 as well as increasing the temperature of the air for power generation, and the temperature of each of the reformer 4 and the evaporator 3 can be set to an appropriate range. Consequently, overheating and insufficient temperature of each of the reformer 4 and the evaporator 3 can be protected, and improvement of power generation efficiency, maintaining of reforming performance, and maintaining of evaporating performance can be achieved.

Particularly, for maintaining of reforming performance, it is necessary to maintain the reforming catalyst in an appropriate temperature range. In order to restrain phenomenon such as bumping it is necessary to avoid an excessive increase in the temperature of the evaporator 3. When the evaporator 3 is overheating, a phenomenon such as bumping occurs and pressure fluctuation occurs in the fuel cell device 50. A problem arises in that pulsation of the air for power generation or the combustion exhaust gas occurs due to the pressure fluctuation, and as a result, the amount of power generation of the fuel cell device 50 fluctuates.

However, the fuel cell device 50 allows each of the reformer and the evaporator to maintain an appropriate temperature range by the heat held by the combustion exhaust gas. Consequently, the reformer is stabilized and the raw material for power generation can be reformed, and bumping in the evaporator is protected and fluctuation of the amount of power generation due to the bumping is reduced, and thus stable power generation can be achieved.

Furthermore, the fuel cell device 50 adopts a configuration in which the evaporator 3, the reformer 4, the combustor 13, the fuel cell 9, the combustion exhaust gas path 16, and the reformed gas path 5 are covered by the first air supply path and the second air supply path. In other words, a configuration is adopted in which the component units stored in the housing 30 are covered by the air for power generation at a low temperature with low heat transfer by conduction. Therefore, a high-temperature portion is not exposed to the outside, and thus the amount of heat radiation to the outside of the housing 30 can be reduced. Also, since the surface temperature of the housing 30 can be reduced, the layer thickness of the heat insulator 20 covering the housing 30 can be thinned, and thus miniaturization and low cost can be achieved.

Also, the heat held by the combustion exhaust gas can be used only for heating of the evaporator 3, the reformer 4, and the air for power generation, and thus the temperature management of the evaporator 3, the reformer 4, and the air for power generation is facilitated with high accuracy. Since the first air heat exchanger 18 and the second air heat exchanger 19 are provided, the temperature of the air for power generation which flows into the fuel cell 9, and the temperature of the fuel cell 9 can be made closer to each other. Thus, the stack temperature of the fuel cell 9 at the time of power generation can be maintained at a desired temperature range. Therefore, in the fuel cell system 100, long-term durability of the fuel cell device 50 can be ensured.

It is to be noted that the evaporator 3 and the reformer 4 are in a rectangular parallelepiped shape in the fuel cell device 50. However, without being limited to this, the evaporator 3 and the reformer 4 may be, for instance, in a column shape or a cylindrical shape. When the evaporator and the reformer 4 are in a cylindrical shape, the internal hollow portion may be an air layer.

The shape of the combustion exhaust gas path 16 is a hollow tube having a rectangular cross section so as to surround the lateral faces of the rectangular parallelepiped-shaped evaporator 3 and reformer 4. Furthermore, the shape of the first air supply path 7 is a tube having a rectangular cross section so as to be in contact with the outer lateral faces of the combustion exhaust gas path 16. However, the shape of the combustion exhaust gas path 16 and the first air supply path 7 may be a hollow cylinder so as to surround the lateral faces of the evaporator 3 and the reformer 4. When the evaporator 3 and the reformer 4 are in a cylindrical shape, and the first air supply path 7 and the combustion exhaust gas path 16 are in a cylindrical shape, the component units may be disposed so that the central axes of all these units are matched.

Also, in the fuel cell device 50, as illustrated in FIG. 1, the fuel cell 9 and the fuel cell storage 10 are in a rectangular parallelepiped shape, however, may be a cylindrical shape, for instance. In this case, the shape of the second air supply path 8 may be a bottomed cylindrical shape which is in contact with and covers the circumferential surface and the bottom surface of the cylindrical-shaped fuel cell storage 10. When the fuel cell 9 and the fuel cell storage 10 are in a cylindrical shape, and the second air supply path 8 is in a bottomed cylindrical shape, the component units may be disposed so that the central axes of all these units are matched.

EXAMPLE OF EMBODIMENT

Figure 3:
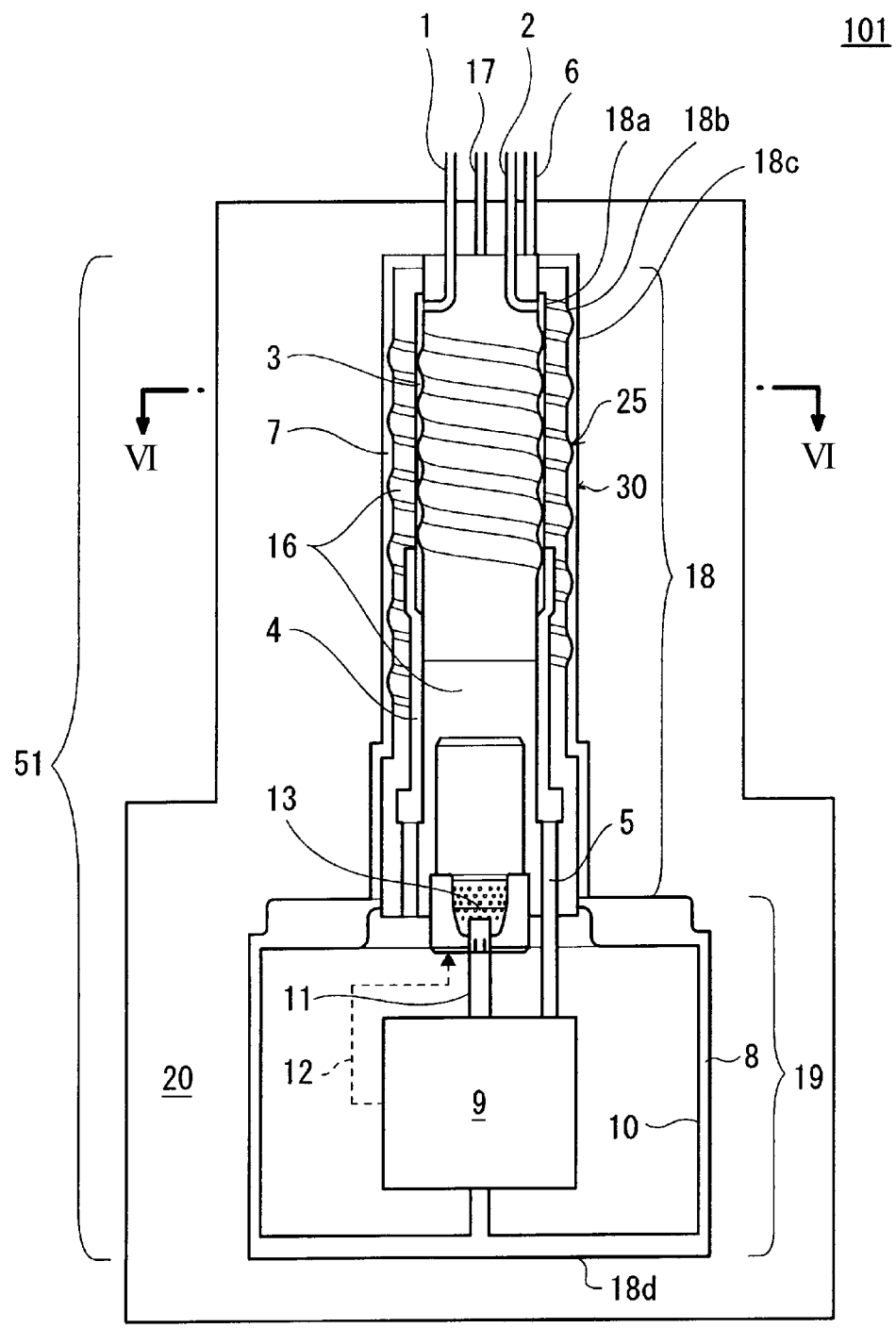
FIG. 3 is a schematic diagram illustrating an example of the main configuration of a fuel cell device included in the fuel cell system according to an example of the embodiment.
Figure 4:
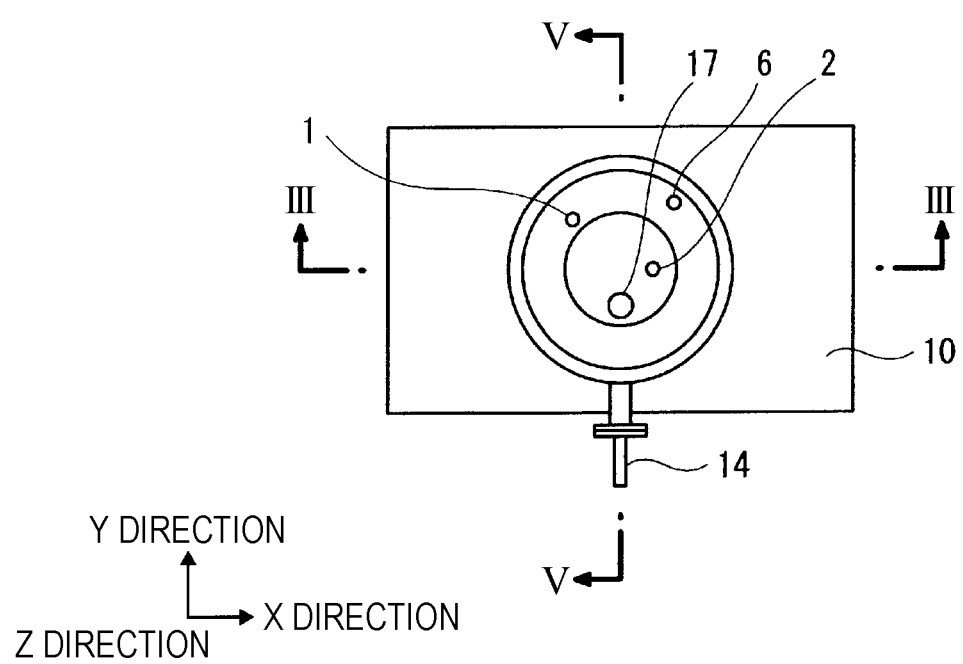
FIG. 4 is a top view of the fuel cell device illustrated in FIG. 3.
Figure 5:
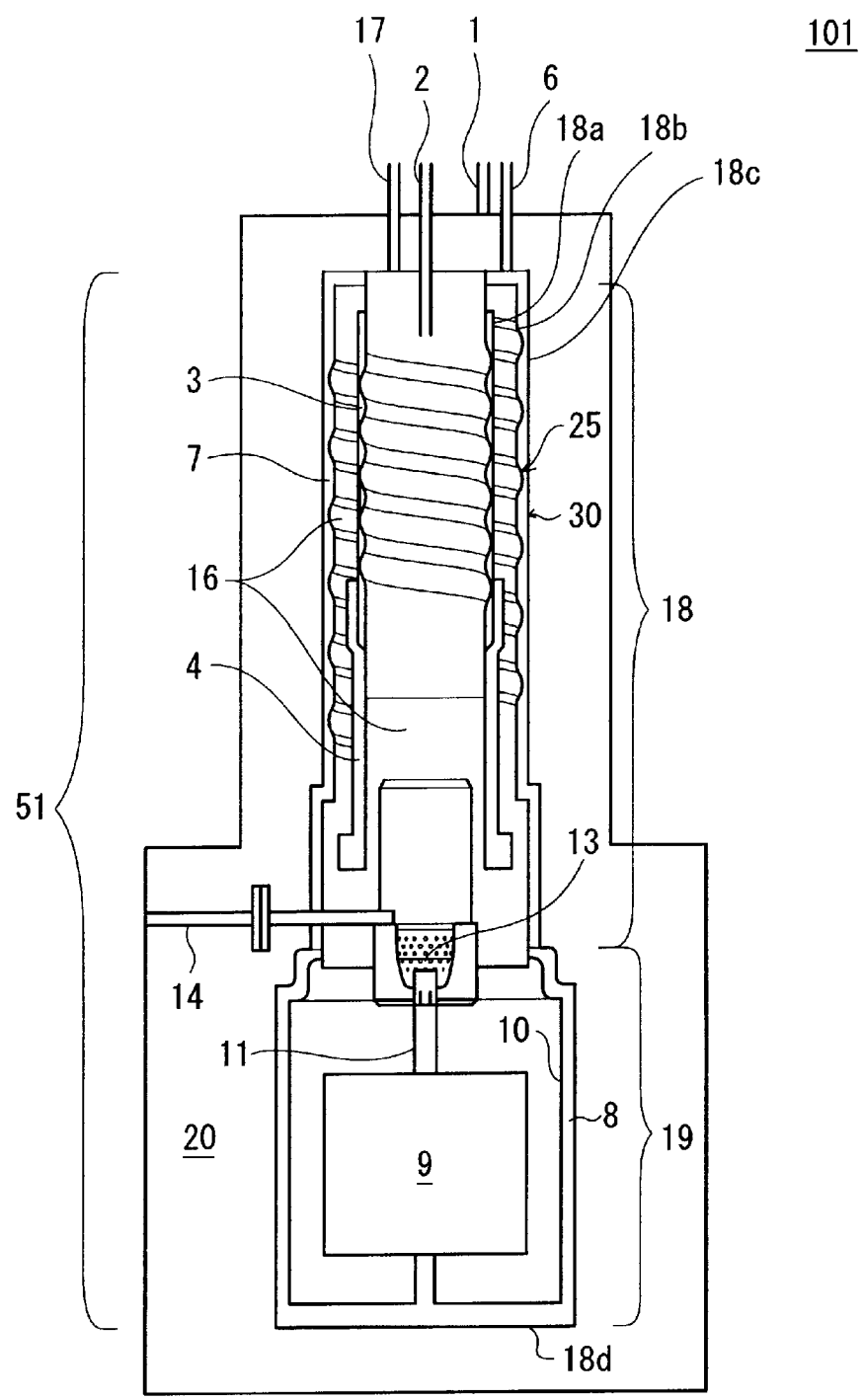
FIG. 5 is a schematic diagram illustrating an example of the main configuration of the fuel cell device included in the fuel cell system according to the example of the embodiment.

A fuel cell device 51 included in a fuel cell system 101 according to an example of an embodiment will be described with reference to FIGS. 3 to 5. FIGS. 3 to 5 illustrate schematic diagrams of an example of the main configuration of the fuel cell device 51 included in the fuel cell system 101 according to the example of the embodiment. FIG. 3 is a lateral sectional view (a cross section perpendicular to the Y direction, that is, III-III cross section illustrated in FIG. 4) of the lateral portion of the fuel cell device 51 according to the example. FIG. 4 is a top view of the fuel cell device 51 according to the example. However, FIG. 4 illustrates a top view of the housing 30 excluding the heat insulator 20 from the configuration of the fuel cell device 51. FIG. 5 is a lateral sectional view (a cross section perpendicular to the X direction, that is, V-V cross section illustrated in FIG. 4) of the lateral portion of the fuel cell device 51 according to the example.

The fuel cell device 51 included in the fuel cell system 101 according to the example includes the same members as in the fuel cell device 50 included in the fuel cell system 100 according to the embodiment. For this reason, the component units included in the fuel cell device 51 according to the example are labeled with the same symbols of the corresponding component units included in the fuel cell device 50 according to the embodiment, and a description of each unit is omitted.

The fuel cell device 51 according to the example differs from the fuel cell device 50 according to the embodiment in that the evaporator 3, the reformer 4, the first air supply path 7, and the combustion exhaust gas path 16 as well as the housing 30 that stores these component units are different in shape. More specifically, in the fuel cell device 51 according to the example, the evaporator 3, the reformer 4, the first air supply path 7, and the combustion exhaust gas path 16 are each a cylindrical shape with the central axis extending in the vertical direction (the Z-axis direction). It is to be noted that the central axes of these component units are matched, and the component units are disposed so that their sectional shapes perpendicular to the extension direction of the central axes are concentric circles. As illustrated in FIGS. 3 and 5, a portion covered by the first air supply path 7, that is, a portion of the housing 30, which stores the first air heat exchanger 18, is a cylindrical shape extending in the Z direction. Also, the configuration of the first air heat exchanger 18 is as follows. That is, the first air heat exchanger 18 includes: a cylindrical inner circumferential wall 18a that surrounds the lateral portions of the evaporator 3 and reformer 4; a tube-shaped boundary wall 18b that is disposed outwardly of the inner circumferential wall 18a so as to surround the inner circumferential wall 18a, and that serves as the boundary between the combustion exhaust gas path 16 and the first air supply path 7; and a tube-shaped outer circumferential wall 18c that is disposed outwardly of the boundary wall 18b so as to surround the boundary wall 18b. The combustion exhaust gas path 16 is formed in the space between the inner circumferential wall 18a and the boundary wall 18b, and the first air supply path 7 is formed in the space between the boundary wall 18b and the outer circumferential wall 18c. It is to be noted that in the fuel cell device 51 according to the example, the outer circumferential wall 18c also serves as an upper portion of the housing 30.

For this reason, in contrast to the fuel cell device 50 according to the embodiment, in which a portion of the housing 30 storing the first air heat exchanger 18 is in a rectangular parallelepiped shape, the surface area of the housing 30, exposed to the outside can be reduced in the fuel cell device 51 according to the example. Thus, miniaturization and reduction of the amount of heat radiation to the outside from the housing 30 can be achieved.

It is to be noted that in the fuel cell device 51 according to the example, not only the above-described first air heat exchanger 18, but also the evaporator 3 and the reformer 4 surrounded by the first air heat exchanger 18 are in a cylindrical shape. When each member is formed as a tube shape, it is possible to form the member by bending, for instance, a thin plate material member in a cylindrical shape and welding one side. Thus the cost can be reduced significantly.

It is to be noted that in the fuel cell device 51 according to the example, a portion of the housing 30 storing the first air heat exchanger 18 is in a cylindrical shape as described above. However, without being limited to this, the housing 30 may be, for instance, in the following shape.

That is, the fuel cell 9 and the fuel cell storage 10 are in a cylindrical shape, and the second air supply path 8 which covers the outer circumference of the fuel cell storage 10 is a bottomed tube shape. It is to be noted that the central axes of these component units are matched, and the component units are disposed so that their sectional shapes perpendicular to the extension direction of the central axes are concentric circles. A portion of the housing 30, which stores a portion covered by the second air supply path 8, may be in a cylindrical shape. In other words, the second air supply path 8 includes the outer wall of the fuel cell storage 10 and an outer circumferential wall 18d that covers the outer wall, and the air for power generation flows through the space between the outer wall of the fuel cell storage 10 and the outer circumferential wall 18d. It is to be noted that this configuration is adopted, the outer circumferential wall 18d that covers the outer wall may serve as a lower portion of the housing 30. In other words, the housing 30 may be formed by the outer circumferential wall 18c included in the first air supply path 7 and the outer circumferential wall 18d included in the second air supply path 8.

Also, the fuel cell device 51 according to the example and the fuel cell device 50 according to the embodiment are different in the following point: That is, as illustrated in FIG. 3 and FIG. 5, in the first air heat exchanger 18, the boundary wall 18b between the first air supply path 7 and the combustion exhaust gas path 16 has a projection-and-depression portion 25. In the projection-and-depression portion 25, a projection portion of the boundary wall 18b is arranged so as to form a spiral in the boundary wall 18b.

It is to be noted that in FIG. 3, a portion projecting outwardly in a radial direction the tube-shaped boundary wall 18b is referred to as a projection portion of the projection-and-depression portion 25, and a portion inward of the projection in a radial direction is referred to as a depression portion of the projection-and-depression portion 25. For instance, even when only projection portions are formed in the boundary wall 18b, a portion between a projection portion and a projection portion is inward of the projection portions in a radial direction, and thus is referred to as a depression portion. Conversely, even when only depression portions are formed in the boundary wall 18b, a portion between a depression portion and a depression portion is outward of the depression portions in a radial direction, and thus is referred to as a projection portion. In other words, the projection-and-depression portion 25 is not necessarily limited to a portion where both a projection portion and a depression portion are formed, and includes a portion where only projection portions are formed or a portion where only depression portions are formed.

As described above, the boundary wall 18b between the first air supply path 7 and the combustion exhaust gas path 16 is configured to have the projection-and-depression portion 25, thereby making it possible to adjust to increase the amount of heat exchange between the combustion exhaust gas and the air for power generation in the first air heat exchanger 18. In addition, since the amount of heat exchange between the combustion exhaust gas and the air for power generation can be adjusted to be increased, the temperature of each of the reformer 4 and the evaporator 3, which is heated by the heat held by the combustion exhaust gas, can be adjusted.

That is, when the boundary wall 18b between the first air supply path 7 and the combustion exhaust gas path 16 in the first air heat exchanger 18 has the projection-and-depression portion 25, the area of heat exchange between the combustion exhaust gas and the air for power generation can be increased. In addition, a turbulent flow can be generated in each of the air for power generation and the combustion exhaust gas, and thus the coefficient of heat transfer can be increased.

Thus, since the boundary wall 18b between the first air supply path 7 and the combustion exhaust gas path 16 has the projection-and-depression portion 25 in the fuel cell device 51 according to the example, heat exchange performance of the first air heat exchanger 18 can be significantly increased. Consequently, the temperature of the air for power generation can be efficiently increased, and the temperature of the combustion exhaust gas can be reduced to a predetermined temperature (for instance, 150 to 250° C.) and discharged to the outside. Also, since the heat exchange performance of the first air heat exchanger 18 can be significantly increased, the heat energy released to the outside in the form of combustion exhaust gas can be significantly reduced, and thus significant improvement of power generation efficiency in the fuel cell system 101 can be achieved.

Figure 6:
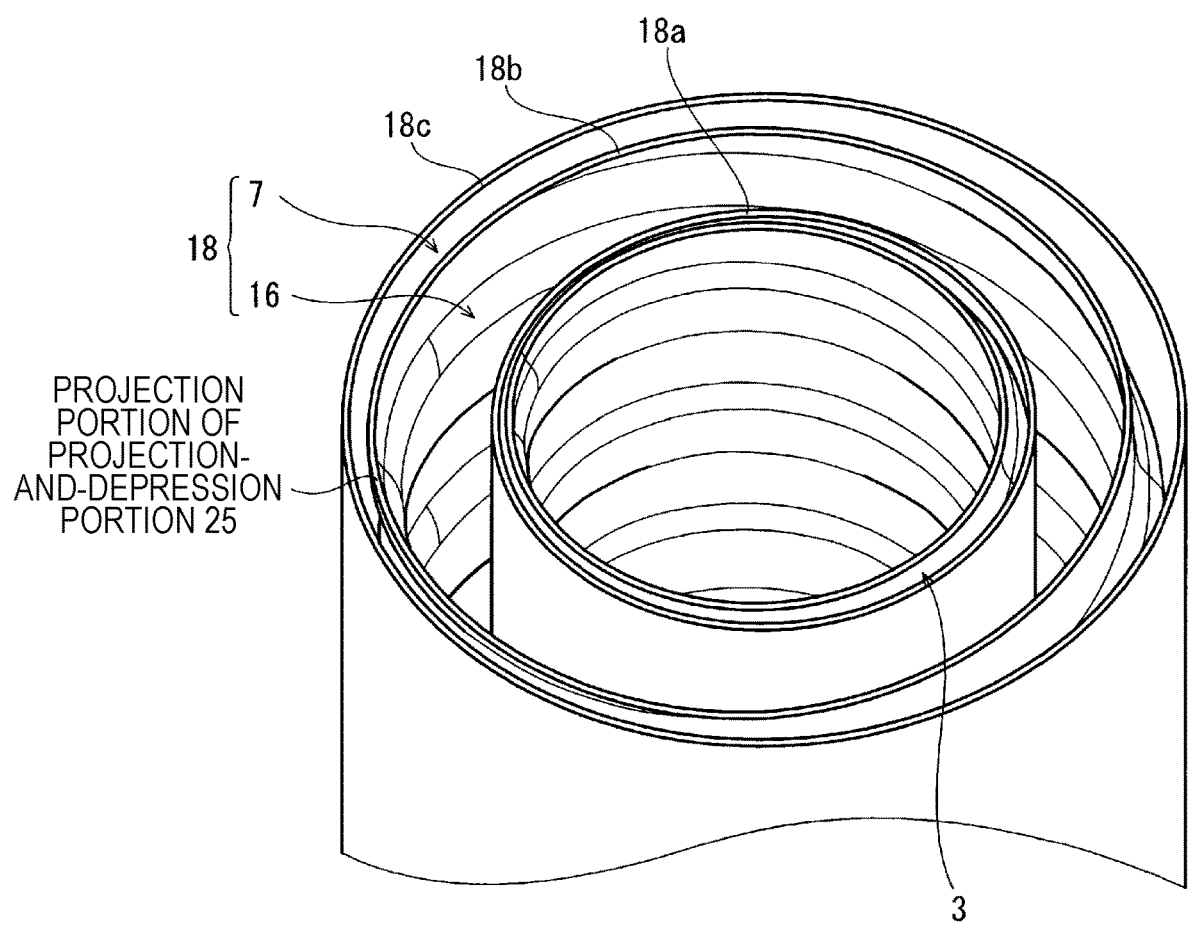
FIG. 6 is a perspective sectional view of the fuel cell device illustrated in FIG. 3 taken along line VI-VI.
Figure 7:
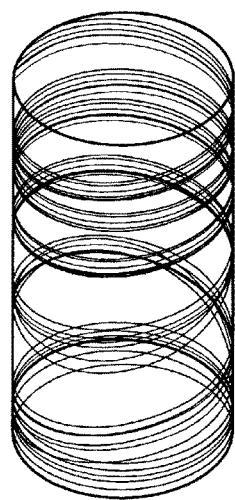
FIG. 7 illustrates a flow of air for power generation which flows through a first air supply path included in the fuel cell device illustrated in FIG. 3.

Particularly, as a processing method to form the projection-and-depression portion 25 in the cylindrical boundary wall 18b, it is possible to adopt a method of molding a depression-and-projection by applying a pressure to the inside and the outside of a cylinder after the cylindrical boundary wall 18b is formed. Thus, in the case where a projection-and-depression portion is molded in a cylindrical shape, such a cylindrical shape can be manufacture at a relatively low cost compared with the case where a projection-and-depression portion is molded in a rectangular tube shape. Also, in order to cause the air for power generation to flow spirally in the first air supply path 7 of the first air heat exchanger 18, the following processing method may be adopted. First, in the boundary wall 18b between the first air supply path 7 and the combustion exhaust gas path 16, the projection-and-depression portion 25 is formed so as to show a spiral extending in a longitudinal direction of the first air heat exchanger 18 while the boundary wall 18b being rotated. In this process, as illustrated in FIG. 6, a projection portion of the projection-and-depression portion 25 has a shape projecting outwardly so as to come into contact with the outer circumferential-side wall that forms the first air supply path 7. Thus, only the depression portion of the projection-and-depression portion 25 forms a flow path, and as illustrated in FIG. 7, the air for power generation can flow through the first air supply path 7 while forming a clear spiral. FIG. 6 is a perspective sectional view of the fuel cell device 51 illustrated in FIG. 3 taken along line VI-VI. FIG. 7 illustrates a flow of air for power generation which flows through the first air supply path 7 included in the fuel cell device 51 illustrated in FIG. 3. FIG. 7 illustrates a result of analysis, by a simulation, of the flow of the air for power generation through the first air supply path 7.

In this manner, in the first air heat exchanger 18, the boundary wall 18b between the first air supply path 7 and the combustion exhaust gas path 16 is provided with the projection-and-depression portion 25, and the first air supply path 7 is provided in a spiral shape along the outer circumference of the tube-shaped combustion exhaust gas path 16, thereby making it possible to significantly enhance the heat exchange performance of the first air heat exchanger 18. However, when the first air heat exchanger 18 is formed in this manner, a pressure loss of the air for power generation flowing through the first air supply path 7 is increased.

Figure 8A:
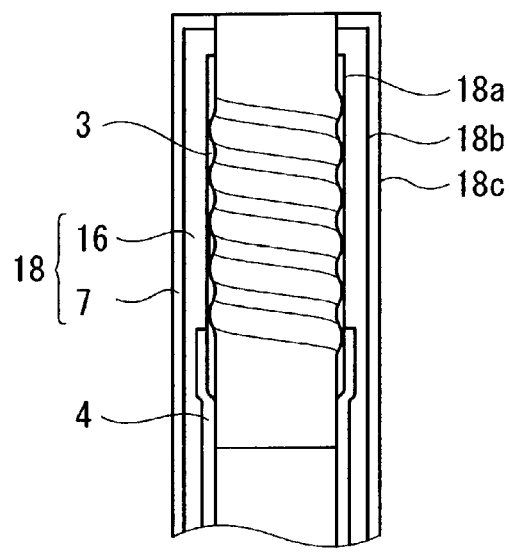
FIGS. 8A-8D illustrate sectional views each depicting an example of a geometry of a boundary wall between the first air supply path and a combustion exhaust gas path of the fuel cell device illustrated in FIG. 3.

It is to be noted that in the fuel cell device 51 illustrated in FIG. 3, the region where the projection-and-depression portion 25 is formed in the boundary wall 18b is a region (the later-described region illustrated in FIG. 8B) corresponding to the outer circumference of the evaporator 3 and the outer circumference of the reformer 4. However, the region where the projection-and-depression portion 25 is formed in the boundary wall 18b is not limited to this. For instance, as illustrated in FIG. 8A, the boundary wall 18b may not be provided with the projection-and-depression portion 25 at all. Also, as illustrated in FIG. 8C, only a region of the boundary wall 18b, which corresponds to the outer circumference of the evaporator 3, may be provided with the projection-and-depression portion 25. As illustrated in FIG. 8D, only a region of the boundary wall 18b, which corresponds to the outer circumference of the reformer 4, may be provided with the projection-and-depression portion 25.

Figure 8B:
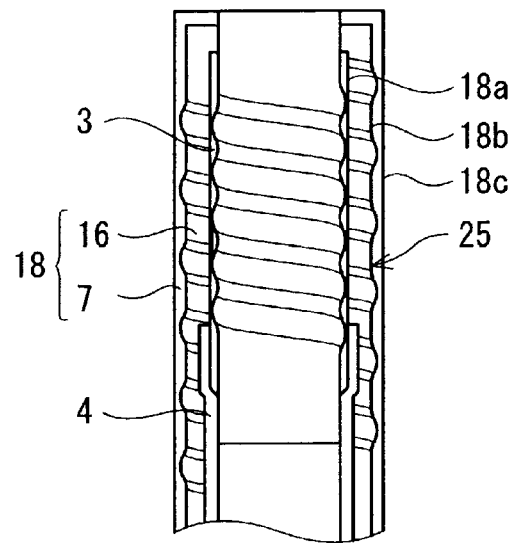
Figure 8C:
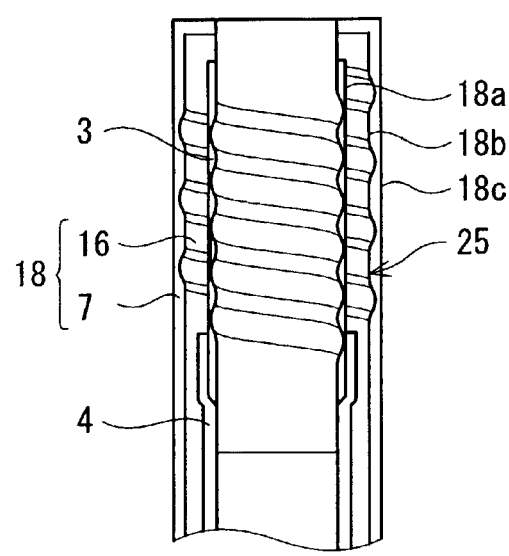
Figure 8D:
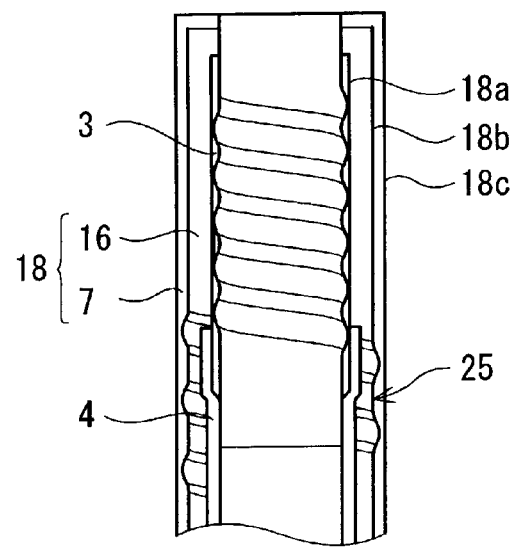

FIGS. 8A-8D illustrate sectional views each depicting an example of a geometry of the boundary wall 18b between the first air supply path 7 and the combustion exhaust gas path 16 of the fuel cell device 51 illustrated in FIG. 3, FIG. 8A illustrates a geometry of the boundary wall 18b having no projection-and-depression portion 25, FIG. 8B illustrates a geometry of the boundary wall 18b in which a projection-and-depression portion 25 is formed in a region corresponding to the outer circumference of each of the evaporator 3 and the reformer 4, FIG. 8C illustrates a geometry of the boundary wall 18b in which a projection-and-depression portion 25 is formed only in a region corresponding to the outer circumference of the evaporator 3, and FIG. 8D illustrates a geometry of the boundary wall 18b in which the projection-and-depression portion 25 is formed only in a region corresponding to the outer circumference of the reformer 4. It is to be noted that herein the outer circumference of the evaporator 3 refers to the outer side surrounding the cylindrical lateral surface of the evaporator 3, and the outer circumference of the reformer 4 refers to the outer side surrounding the cylindrical lateral surface of the reformer 4.

Like this, a region where the projection-and-depression portion 25 is formed may be one of various regions. According to the difference in the region where the projection-and-depression portion 25 is formed, a situation of heating to the evaporator 3, the reformer 4, and the air for power generation by the heat held by the combustion exhaust gas is as follows. Specifically, as illustrated in FIG. 8A, when the projection-and-depression portion 25 is not provided in the boundary wall 18b between the first air supply path 7 and the combustion exhaust gas path 16 in the first air heat exchanger 18, the heat held by the combustion exhaust gas can be distributed relatively equally among respective portions of the air for power generation which flows through the evaporator 3, the reformer 4, and the first air supply path 7. In the fuel cell device 51 according the embodiment, when the projection-and-depression portion 25 is not provided in the boundary wall 18b, the amount of heat which moves from the combustion exhaust gas to the reformer 4, and the amount of heat which moves from the combustion exhaust gas to the evaporator 3 increase. Therefore, when it is desirable to increase the amount of heat which moves from the combustion exhaust gas to the evaporator 3 or reformer 4, the projection-and-depression portion 25 is not provided in the boundary wall 18b.

Also, as illustrated in FIG. 8B, when the projection-and-depression portion 25 is formed in a region of the boundary wall 18b between the first air supply path 7 and the combustion exhaust gas path 16, the region corresponding to the outer circumference of each of the evaporator 3 and the reformer 4, the amount of heat which moves from the combustion exhaust gas to the air for power generation is increased. Thus, a reduced amount of heat moves from the combustion exhaust gas to the evaporator 3 and the reformer 4 located on the radially inner side of the combustion exhaust gas path 16.

Thus, for instance, when it is undesirable to increase the temperature of the reformer 4 more than necessary, as illustrated in FIG. 8D, the projection-and-depression portion 25 is formed in a region of the boundary wall 18b, which corresponds to the outer circumference of the reformer 4. Conversely, when it is undesirable to increase the temperature of the evaporator 3, as illustrated in FIG. 8C, the projection-and-depression portion 25 is formed in a region of the boundary wall 18b, which corresponds to the outer circumference of the evaporator 3.

As described above, the performance of heat exchange between the combustion exhaust gas and the air for power generation in the first air heat exchanger 18 can be adjusted in consideration of the region where the projection-and-depression portion 25 is formed. Also, when the projection-and-depression portion 25 is provided on the entire boundary wall 18b in order to maximize the performance of heat exchange between the combustion exhaust gas and the air for power generation in the first air heat exchanger 18, miniaturization of the first air heat exchanger 18 is achieved.

Furthermore, by the formation of the projection-and-depression portion 25 in the boundary wall 18b, it is possible to adjust the performance of heat exchange between the combustion exhaust gas and the air for power generation in the first air heat exchanger 18, and thus the temperature of the evaporator 3 and the reformer 4 heated by the heat held by the combustion exhaust gas is also adjustable. Thus, the temperature of each of the evaporator 3 and the reformer 4 can be adjusted to be an optimal temperature in consideration of the region where the projection-and-depression portion 25 is formed in the boundary wall 18b. Therefore, the performance of the reforming catalyst disposed in the reformer 4 can be maintained. When the amount of heat which moves from the combustion exhaust gas to the evaporator 3 is increased, miniaturization of the evaporator 3 can be achieved.

It is to be noted that in the fuel cell device 51 according to the example of the embodiment, although the projection portion of the projection-and-depression portion 25 is spirally arranged in the boundary wall 18b, the manner of arrangement of the projection-and-depression portion 25 is not limited to this. For instance, in the projection-and-depression portion 25, plural projection portions formed over the entire circumference in a circumferential direction of the tube-shaped boundary wall 18b may be arranged at predetermined intervals.

From the above description, it is apparent that further improvement of the present disclosure and other embodiments can be made by those skilled in the art. Therefore, the foregoing description should be interpreted only as an example and is provided for the purpose of teaching the best mode for carrying out the present disclosure to those skilled in the art. The details of the structures and/or functions of the present disclosure may be substantially changed without departing from the spirit the present disclosure.

The present disclosure can achieve reduction of heat radiation from the inside of the housing and improvement of the performance of heat exchange between the combustion exhaust gas and the air for power generation, and thus is useful for, for instance, a fuel cell device including a solid oxide fuel cell utilizing hot exhaust heat.

What is claimed is:

1. A fuel cell device comprising:
    a reformer that reforms a raw material for power generation and generates a reformed gas;
    a fuel cell that generates electric power utilizing air for power generation and the reformed gas;
    a combustor that combusts both an off-gas of the reformed gas and an off-gas of the air for power generation discharged from the fuel cell, and generates a combustion exhaust gas which serves as a heat source of the reformer;
    a first air heat exchanger that has a combustion exhaust gas path through which the combustion exhaust gas flows and a first air supply path through which the air for power generation flows, and that heats the air for power generation by heat exchange between the combustion exhaust gas and the air for power generation;
    a fuel cell storage which stores the fuel cell, and through which the off-gas of the air for power generation discharged from the fuel cell and heading to the combustor flows;
    a second air heat exchanger that has a second air supply path which supplies the air for power generation, which has flowed through the first air supply path, to the fuel cell, and that heats the air for power generation by heat exchange between the off-gas of the air for power generation which flows in the fuel cell storage and the air for power generation which flows through the second air supply path; and
    a housing that stores the reformer, the fuel cell, the combustor, the first air heat exchanger, the fuel cell storage, and the second air heat exchanger,
    wherein the first air supply path and the second air supply path are disposed to cover whole members stored in the housing, and
    wherein the reformer, the combustor, and the fuel cell storage storing the fuel cell are arranged in that order along with a direction in which the air for power generation flows through the first and second air supply paths, whereby the air for power generation is heated before the air for power generation is supplied to the fuel cell.

2. The fuel cell device according to claim 1,
    wherein the reformer generates the reformed gas from the raw material for power generation by steam reforming,
    an evaporator that supplies vapor to the reformer is provided in the housing, the vapor being obtained by evaporating reforming water utilized in the steam reforming, and
    the combustion exhaust gas serves as a heat source of the reformer and the evaporator.

3. The fuel cell device according to claim 2,
    wherein the combustion exhaust gas path is disposed to surround a lateral side of each of the reformer and the evaporator,
    the first air supply path is disposed to surround an outer periphery of the combustion exhaust gas path, and
    the second air supply path is disposed along an outer periphery of the fuel cell storage.

4. The fuel cell device according to claim 3,
    wherein the reformer and the evaporator are disposed in a combustion space provided over the combustor, and the fuel cell is disposed in the fuel cell storage provided under the combustor.

5. The fuel cell device according to claim 3,
    wherein the first air heat exchanger includes a tube-shaped inner peripheral wall that surrounds a lateral side of each of the reformer and the evaporator, a tube-shaped boundary wall that is disposed outwardly of the inner peripheral wall to surround the inner peripheral wall, and that serves as a boundary between the combustion exhaust gas path and the first air supply path, and a tube-shaped outer peripheral wall that is disposed outwardly of the boundary wall to surround the boundary wall, and
    the combustion exhaust gas path is formed in a space between the inner peripheral wall and the boundary wall, and the first air supply path is formed in a space between the boundary wall and the outer peripheral wall.

6. The fuel cell device according to claim 5,
    wherein in the first air heat exchanger, a projection-and-depression portion is formed in at least part of the boundary wall.

7. The fuel cell device according to claim 6,
    wherein in the projection-and-depression portion, a projection portion projecting in a radial direction of the boundary wall is spirally arranged in an outer periphery of the tube-shaped boundary wall.

8. The fuel cell device according to claim 6,
wherein the projection-and-depression portion, plural projection portions projecting in a radial direction of the boundary wall, formed over an entire periphery in a circumferential direction of the tube-shaped boundary wall are arranged at predetermined intervals.

9. The fuel cell device according to claim 2,
wherein the reformer is located under the evaporator in a combustion space of the combustor,
the combustion exhaust gas path is provided between the evaporator and the first air supply path as well as between the reformer and the first air supply path, and
the reformer is heated by combustion heat of the combustor, the reformer and the evaporator are heated in this order by heat held by the combustion exhaust gas generated by the combustor, and the air for power generation is heated in the first air heat exchanger.

10. The fuel cell device according to claim 1, further comprising a reformed gas path through which the reformed gas flows from the reformer to the fuel cell, the reformed gas path running along the combustion exhaust gas path and running in the fuel cell storage to reach the fuel cell.

* * * * *